(12) United States Patent
Wu

(10) Patent No.: US 12,127,026 B2
(45) Date of Patent: Oct. 22, 2024

(54) INFORMATION PROCESSING METHOD, DEVICE, AND SYSTEM

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 470 days.

(21) Appl. No.: 17/400,254

(22) Filed: Aug. 12, 2021

(65) Prior Publication Data

US 2021/0377771 A1 Dec. 2, 2021

Related U.S. Application Data

(63) Continuation of application No. PCT/CN2020/074870, filed on Feb. 12, 2020.

(30) Foreign Application Priority Data

Feb. 14, 2019 (CN) .......................... 201910115141.0

(51) Int. Cl.
*H04W 24/10* (2009.01)

(52) U.S. Cl.
CPC .................................. *H04W 24/10* (2013.01)

(58) Field of Classification Search
None
See application file for complete search history.

(56) References Cited

U.S. PATENT DOCUMENTS

| 2011/0242969 A1 | 10/2011 | Dayal et al. |
| 2012/0020231 A1 | 1/2012 | Chen et al. |

(Continued)

FOREIGN PATENT DOCUMENTS

| CN | 102045737 A | 5/2011 |
| CN | 103444100 A | 12/2013 |

(Continued)

OTHER PUBLICATIONS

International Search Report & Written Opinion related to Application No. PCT/CN2020/074870; reported on May 11, 2020.

(Continued)

*Primary Examiner* — Hong Shao
(74) *Attorney, Agent, or Firm* — von Briesen & Roper, s.c.

(57) ABSTRACT

Embodiments of this application disclose an information processing method, a device, and a system. A specific solution is as follows: The UE performs any one of the following processing in a case that IDC interference is present in the UE: transmitting first information, transmitting additional information, transmitting first information and additional information, transmitting first information, second information, and additional information, skipping transmitting first information, skipping transmitting second information, or skipping transmitting first information and second information, where the first information is the information provided by the UE and not affected by IDC interference, the second information is the information provided by the UE and provided by the UE and IDC interference, and the additional information is used to indicate that the UE is affected by IDC interference.

20 Claims, 7 Drawing Sheets

(56) References Cited

U.S. PATENT DOCUMENTS

| | | |
|---|---|---|
| 2012/0276897 A1 | 11/2012 | Kwon et al. |
| 2012/0276936 A1* | 11/2012 | Ahn .................. H04W 76/19 |
| | | 455/501 |
| 2013/0324172 A1 | 12/2013 | Ahn et al. |
| 2014/0301235 A1 | 10/2014 | Ahn et al. |
| 2014/0335855 A1 | 11/2014 | Lee et al. |
| 2015/0131558 A1* | 5/2015 | Van Lieshout ... H04W 36/0005 |
| | | 370/329 |
| 2016/0295602 A1 | 10/2016 | Ahn et al. |
| 2018/0206142 A1 | 7/2018 | Ahn et al. |
| 2020/0128564 A1 | 4/2020 | Takeda et al. |
| 2020/0205146 A1 | 6/2020 | Takahashi et al. |
| 2020/0236669 A1 | 7/2020 | Takeda et al. |

FOREIGN PATENT DOCUMENTS

| | | |
|---|---|---|
| CN | 104081811 A | 10/2014 |
| JP | 2014009493 A | 1/2014 |
| JP | 2014509493 A | 4/2014 |
| JP | 2014150554 A | 8/2014 |
| JP | 2015111867 A | 6/2015 |
| JP | 2018011315 A | 1/2018 |
| WO | 2018230361 A1 | 12/2018 |
| WO | 2018235248 A1 | 12/2018 |
| WO | 2019021486 A1 | 1/2019 |

OTHER PUBLICATIONS

Second Chinese Office Action related to Application No. 201910115141.0; reported on Sep. 18, 2021.

Second Japanese Office Action related to Application No. 2021-647490; reported on Apr. 25, 2023.

Extended European Search Report for related Application No. 20754866.0; reported on Mar. 4, 2022.

Japanese First Office Action for related Application No. 2021-547490; reported on Oct. 18, 2022.

Research in Motion UK Limited, "Signaling Procedures for IDC operation" Mar. 26-30, 2012, 3GPP TSG-RAN WG2 Meeting #77b, Jeju, Korea, R2-121281.

LG Electronics, "Ue type scenario considering IDC problems" Nov. 11-15, 2013, 3GPP TSG-RAN WG3 Meeting #82, San Francisco, USA, R2-132222.

* cited by examiner

INFORMATION PROCESSING METHOD, DEVICE, AND SYSTEM

This application is a continuation application of a PCT Application No. PCT/CN2020/074870 filed on Feb. 12, 2020, which claims priority to Chinese Patent Application No. 201910115141.0, filed with the China National Intellectual Property Administration on Feb. 14, 2019 and entitled "INFORMATION PROCESSING METHOD, DEVICE, AND SYSTEM", which is incorporated herein by reference in its entirety.

TECHNICAL FIELD

Embodiments of this application relate to the field of communications technologies, and in particular, to an information processing method, a device, and a system.

BACKGROUND

Generally, after performing network measurement or network connection, user equipment (UE) can report a measurement result or a connection failure report to a network device.

However, one UE may include a plurality of transceiver modules using different radio access technologies (for example, a long term evolution (LTE) module and a fifth-generation mobile communication (5G) module). In this case, when the frequency at which the UE transmits signals and the frequency at which the UE receives signals are adjacent frequencies or resonant frequencies, a receiving module of the UE may receive interference from a transmitting module of the UE (they may be transceiver modules using a same radio access technology or different radio access technologies), that is, in-device coexistence (IDC) interference is present in the UE. Therefore, the measurement result (or the connection failure report) provided by the UE may be a measurement result (or a connection failure report) affected by IDC interference, and as a result, the measurement result or the connection failure report reported by the UE is not accurate enough.

SUMMARY

The following technical solutions are used in the embodiments of this application.

According to a first aspect of the embodiments of this application, an information processing method is provided, applied to UE, where the information processing method may include: performing any one of the following processing in a case that IDC interference is present in the UE: transmitting first information, transmitting additional information, transmitting first information and additional information, transmitting first information, second information, and additional information, skipping transmitting first information, skipping transmitting second information, or skipping transmitting first information and second information, where the first information is the information provided by the UE and not affected by IDC interference, the second information is the information provided by the UE and affected by IDC interference, and the additional information is used to indicate that the UE is affected by IDC interference.

According to a second aspect of the embodiments of this application, an information processing method is provided, applied to a first network device, where the information processing method may include: receiving additional information transmitted by UE, where the additional information is transmitted in a case that IDC interference is present in the UE, and the additional information is used to indicate that the UE is affected by IDC interference; and transmitting the additional information to a second network device.

According to a third aspect of the embodiments of this application, UE is provided, where the UE may include a processing unit. The processing unit is configured to perform any one of the following processing in a case that IDC interference is present in the UE: transmitting first information, transmitting additional information, transmitting first information and additional information, transmitting first information, second information, and additional information, skipping transmitting first information, skipping transmitting second information, or skipping transmitting first information and second information, where the first information is the information provided by the UE and not affected by IDC interference, the second information is the information provided by the UE and affected by IDC interference, and the additional information is used to indicate that the UE is affected by IDC interference.

According to a fourth aspect of the embodiments of this application, a network device is provided, where the network device is a first network device and may include a receiving unit and a transmitting unit. The receiving unit is configured to receive additional information transmitted by UE, where the additional information is transmitted in a case that IDC interference is present in the UE, and the additional information is used to indicate that the UE is affected by IDC interference. The transmitting unit is configured to transmit the additional information received by the receiving unit to a second network device.

According to a fifth aspect of the embodiments of this application, UE is provided, where the UE includes a processor, a memory, and a computer program stored in the memory and capable of running on the processor, and when the computer program is executed by the processor, the steps of the information processing method according to the foregoing first aspect are implemented.

According to a sixth aspect of the embodiments of this application, a network device is provided, where the network device includes a processor, a memory, and a computer program stored in the memory and capable of running on the processor, and when the computer program is executed by the processor, the steps of the information processing method according to the foregoing second aspect are implemented.

According to a seventh aspect of the embodiments of this application, a communications system is provided, where the communications system includes the UE according to the third aspect and the network device according to the fourth aspect; or the communications system includes the UE according to the fifth aspect and the network device according to the sixth aspect.

According to an eighth aspect of the embodiments of this application, a computer-readable storage medium is provided, where the computer-readable storage medium stores a computer program, and when the computer program is executed by a processor, the steps of the information processing method according to the first aspect or the steps of the information processing method according to the second aspect are implemented.

DESCRIPTION OF EMBODIMENTS

Figure 1:
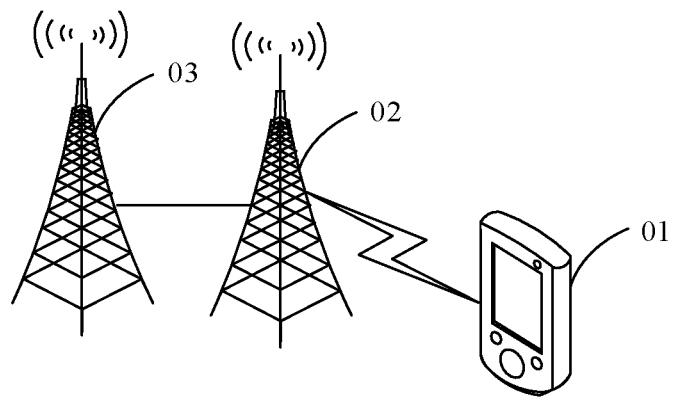
FIG. 1 is a schematic architectural diagram of a communications system according to an embodiment of this application.

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

In the specification of the embodiments of this application and the claims of this application, the terms "first", "second", and so on are intended to distinguish between different objects but do not indicate a particular order of the objects. For example, first information, second information, and the like are used to distinguish different information, rather than describe a specific sequence of the information.

In the descriptions of the embodiments of this application, "plurality" indicates two or more, unless otherwise specified. For example, a plurality of elements refers to two or more elements.

The term "and/or" in the specification describes an association relationship for describing associated objects and represents that three relationships may exist. For example, display panel and/or backlight may represent the following three cases: display panel alone, both display panel and backlight, and backlight alone. The symbol "/" herein indicates an "or" relationship of associated objects. For example, input/output means input or output.

In the embodiments of this application, the terms such as "an example" or "for example" are used to represent an example, an illustration, or a description. Any embodiment or design scheme described as "an example" or "for example" in the embodiments of this application should not be construed as being more preferred or advantageous than other embodiments or design schemes. Specifically, the terms such as "an example" or "for example" are used to present related concepts in a specific manner.

Some concepts and/or terms used in an information processing method, a device, and a system that are provided in the embodiments of this application are explained below.

A UE connection failure type may include any one of the following: handover failure (for example, handover is not completed within a specified time (for example, timer t304 expires)), secondary cell group (SCG) handover failure (for example, access to a new SCG is not completed within a specified time (for example, timer t307 expires)), or radio link failure (RLF). The radio link failure may include any one of the following: physical layer out of synchronization (for example, timer t310 expires), a media access control (MAC) layer random access failure (for example, the maximum number of random access attempts is reached), an indication indicating that the maximum number of radio link control protocol (RLC) layer retransmissions is reached (for example, the maximum number of RLC layer retransmissions is reached), or a beam failure (for example, beam recovery procedure failure).

For a master cell group (MCG) connection failure: UE takes the connection failure information as part of a radio link failure report (that is, rlf-Report). When initiating a connection reestablishment, the UE may indicate in a connection reestablishment complete message whether there is a radio failure report (that is, "rlf-Info Available" indication information). If a network device receiving this indication information needs to obtain the radio link failure report, the network device may transmit request information (that is, rlf-Report Req) to the UE, requesting the UE to report the radio link failure report. The UE may transmit the radio link failure report to the network device based on the request information transmitted by the network device. For an SCG connection failure: UE reports SCG connection failure information through an MCG connection.

The foregoing radio link failure report may include at least one of the following: a failure type (for example, random access failure, physical layer failure (that is, timer t310 expires), a maximum number of RLC layer retransmissions reached, or beam recovery procedure failure)), a cell radio network temporary identifier (C-RNTI) of UE, a measurement result of UE such as reference signal received power (RSRP) and reference signal received quality (RSRQ) of the last serving cell and neighboring cell, geographical location information of UE (for example, global navigation satellite system (GNSS) based coordinates and velocity of the UE), or an identifier of a primary cell (PCell) where a failure has occurred.

Embodiments of this application provide an information processing method, a device, and a system. UE may perform any one of the following processing in a case that IDC interference is present in the UE: transmitting first information (that is, the information provided by the UE and not affected by IDC interference), transmitting additional information (which is used to indicate that the UE is affected by IDC interference), transmitting first information and additional information, transmitting first information, second information (that is, the information provided by the UE and affected by IDC interference), and additional information, skipping transmitting first information, skipping transmitting second information, or skipping transmitting first information and second information. The UE does not directly transmit the first information and the second information to a network device in a case that IDC interference is present in the UE, avoiding that information which is not accurate enough is reported by the UE, thereby improving the accuracy of the information reported by the UE.

The information processing method, the device, and the system that are provided in the embodiments of this application may be applied to a communications system, and specifically, may be applied to a procedure in which UE in the communications system processes information in the UE in a case that IDC interference is present in the UE.

FIG. 1 is a schematic architectural diagram of a communications system according to an embodiment of this application. As shown in FIG. 1, the communications system may include UE 01, a network device 02, and a network device 03. The UE 01 may establish a connection and communicate with the network device 02, and the network device 02 may establish a connection and communicate with the network device 03.

It should be noted that in this embodiment of this application, the connection between the network device 02 and the network device 03 shown in FIG. 1 may be wireless. To indicate a connection relationship between the network device 02 and the network device 03 more clearly, a solid line is used in FIG. 1 to indicate the connection relationship between the network device 02 and the network device 03.

The UE is a device that provides a user with voice and/or data connectivity, a handheld device with a wired/wireless connection function, or another processing device connected to a wireless modem. The UE may communicate with one or more core network devices through a radio access network (RAN). The UE may be a mobile terminal, such as a mobile phone (or referred to as a "cellular" phone) and a computer with a mobile terminal, or may be a portable, pocket-sized, handheld, computer built-in or vehicle-mounted mobile apparatus, which exchanges voice and/or data with the RAN. For example, the UE is a device such as a personal communication service (PCS) phone, a cordless telephone set, a session initiation protocol (SIP) phone, a wireless local loop (WLL) station, or a personal digital assistant (PDA). The UE may also be referred to as a user agent, a terminal device, or the like.

The network device may be a base station. The base station is an apparatus deployed in a RAN and configured to provide a wireless communication function for the UE. The base station may include various forms of macro base stations, micro base stations, relay nodes, access points, and the like. In systems using different radio access technologies, a device with a base station function may have different names. For example, in a third-generation mobile communication (3G) network, it is referred to as a base station (NodeB); in an LTE system, it is referred to as an evolved base station (evolved NodeB, eNB or eNodeB); in a fifth-generation mobile communication (5G) network, it is referred to as a gNB, and so on. With evolution of communications technologies, the name "base station" may change.

The following details the information processing method, the device, and the system that are provided in the embodiments of this application through specific embodiments and application scenarios thereof with reference to the accompanying drawings.

Figure 2:
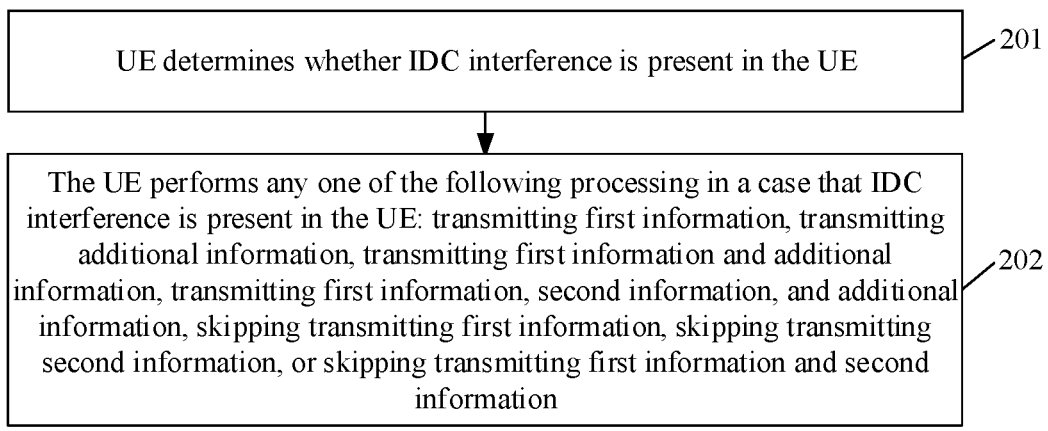
FIG. 2 is a first schematic diagram of an information processing method according to an embodiment of this application.

Based on the communications system shown in FIG. 1, this embodiment of this application provides an information processing method. As shown in FIG. 2, the information processing method may include the following steps 201 and 202.

Step 201. UE determines whether IDC interference is present in the UE.

Optionally, in this embodiment of this application, after performing a network measurement or a network connection, the UE may first determine whether IDC interference is present in the UE, and then determine how to process a measurement result or connection failure report.

It should be noted that a method for determining, by the UE, whether IDC interference is present in the UE is a prior art, and reference may be made to related description of the prior art, and details are not described herein.

Step 202. The UE performs any one of the following processing in a case that IDC interference is present in the UE: transmitting first information, transmitting additional information, transmitting first information and additional information, transmitting first information, second information, and additional information, skipping transmitting first information, skipping transmitting second information, or skipping transmitting first information and second information.

In this embodiment of this application, the first information is the information provided by the UE and not affected by IDC interference, the second information is the information provided by the UE and affected by IDC interference, and the additional information is used to indicate that the UE is affected by IDC interference.

Optionally, in this embodiment of this application, the first information may be the measurement result provided by the UE and not affected by IDC interference, and the second information may be the measurement result provided by the UE and affected by IDC interference.

It may be understood that the first information and the second information may be all measurement results obtained by the UE after measurements.

Optionally, in this embodiment of this application, after receiving measurement configuration information transmitted by a network device (the measurement configuration information may include a measurement object configuration and a measurement reporting configuration), the UE may perform a measurement (for example, a cell measurement, a frequency measurement, and a beam measurement) based on the measurement configuration information, and in a case that the measurement results obtained after measurement satisfy a reporting condition (for example, an event A5 is triggered) and that IDC interference is present in the UE, the UE may determine which obtained measurement results are not affected by IDC interference and which measurement results are affected by IDC interference, and then process the measurement results accordingly.

For example, in a case IDC interference is present in the UE, after the UE has measured frequency 1, frequency 2, and frequency 3 based on the measurement configuration information, if the UE determines that a measurement result for frequency 1 and a measurement result for frequency 2 are measurement results not affected by IDC interference, and a measurement result for frequency 3 is a measurement result affected by IDC interference, the UE may transmit the measurement result for frequency 1 and the measurement result for frequency 2 to the network device.

Optionally, in this embodiment of this application, the first information may be the connection failure report provided by the UE and not affected by IDC interference, and the second information may be the connection failure report provided by the UE and affected by IDC interference.

It may be understood that both the first information and the second information may be connection failure reports generated when the UE fails to be connected.

Optionally, in this embodiment of this application, the additional information may include at least one of the following: first indication information, first frequency information, first cell information, first cell group information, first beam information, or first type information, where the first indication information is used to indicate that the UE is affected by IDC interference, the first frequency information is used to indicate a frequency corresponding to the information provided by the UE and affected by IDC interference, the first cell information is used to indicate a cell corresponding to the information provided by the UE and affected by IDC interference, the first cell group information is used to indicate a cell group corresponding to the information provided by the UE and affected by IDC interference, the first beam information is used to indicate a beam corresponding to the information provided by the UE and affected by IDC interference, and the first type information is used to indicate a type corresponding to the information provided by the UE and affected by IDC interference.

Optionally, in this embodiment of this application, the first indication information is used to indicate that the measurement result is provided by the UE and affected by IDC interference, the first frequency information is used to indicate a frequency corresponding to the measurement result affected by IDC interference (that is, measurement results of which frequencies are affected by IDC interference), the first cell information is used to indicate a cell corresponding to the measurement result affected by IDC interference (that is, measurement results of which cells are affected by IDC interference), the first cell group information is used to indicate a cell group corresponding to the measurement result affected by IDC interference (that is, measurement results of which cell groups are affected by IDC interference), the first beam information is used to indicate a beam corresponding to the measurement result affected by IDC interference (that is, measurement results of which beams are affected by IDC interference), and the first type information is used to indicate a type corresponding to the measurement result affected by IDC interference (that is, measurement results of which type are affected by IDC interference).

Optionally, in this embodiment of this application, the first indication information is used to indicate that a connection failure report of the UE is affected by IDC interference, the first frequency information is used to indicate a frequency corresponding to a connection failure report affected by IDC interference (that is, connection failure reports on which frequencies are affected by IDC interference), the first cell information is used to indicate a cell corresponding to a connection failure report affected by IDC interference (that is, connection failure reports of which cells are affected by IDC interference), the first cell group information is used to indicate a cell group corresponding to a connection failure report affected by IDC interference (that is, connection failure reports of which cell groups are affected by IDC interference), the first beam information is used to indicate a beam corresponding to a connection failure report affected by IDC interference (that is, connection failure reports on which beams are affected by IDC interference), and the first type information is used to indicate a type corresponding to a connection failure report affected by IDC interference (that is, connection failure reports of which type are affected by IDC interference).

It should be noted that in this embodiment of this application, in a case that the information provided by the UE and affected by IDC interference is a measurement result, the first type information may be referred to as first measurement type information; and in a case that the information provided by the UE and affected by IDC interference is a connection failure report, the first type information may be referred to as first connection failure type information It can be understood that the first measurement type information is used to indicate a measurement type corresponding to the measurement result provided by the UE and affected by IDC interference, and the first connection failure type information is used to indicate a connection failure type corresponding to the connection failure report provided by the UE and affected by IDC interference Optionally, in this embodiment of this application, in a case that the information provided by the UE and affected by IDC interference is a measurement result, the first type information is used to indicate a measurement type corresponding to the measurement result provided by the UE and affected by IDC interference. The first type information may include at least one of the following: reference signal received power (RSRP), reference signal received quality (RSRQ), reference signal time difference (RSTD), received signal strength indicator (RSSI), block error rate (BLER), channel occupancy ratio (CR), channel busy ratio (CBR), or signal to interference plus noise ratio (SINR).

Optionally, in this embodiment of this application, the first beam information may include at least one of the following: synchronization signal block (SSB) identifier or channel state information reference signal (CSI-RS) identifier.

It should be noted that when the information provided by the UE and affected by IDC interference is a connection failure report, for description of the first type information (that is, the first connection failure type information), reference may be made to the description in the foregoing embodiment, and details are not described herein again.

This embodiment of this application provides an information processing method, where UE may perform any one of the following processing in a case that IDC interference is present in the UE: transmitting first information (that is, the information provided by the UE and not affected by IDC interference), transmitting additional information (which is used to indicate that the UE is affected by IDC interference), transmitting first information and additional information, transmitting first information, second information (that is, the information provided by the UE and affected by IDC interference), and additional information, skipping transmitting first information, skipping transmitting second information, or skipping transmitting first information and second information. The UE does not directly transmit the first information and the second information to the network device in a case that IDC interference is present in the UE, avoiding that information which is not accurate enough is reported by the UE, thereby improving the accuracy of the information reported by the UE.

Figure 3:
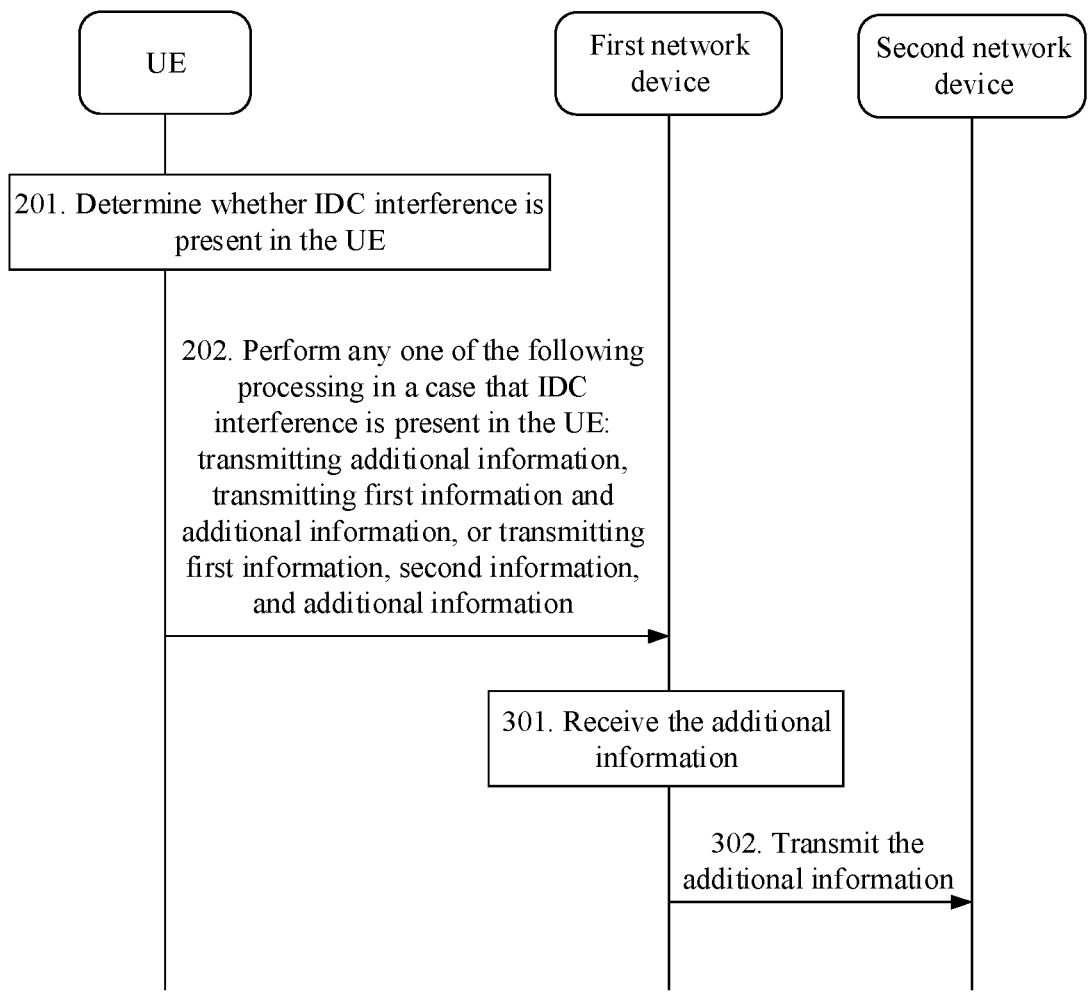
FIG. 3 is a second schematic diagram of an information processing method according to an embodiment of this application.

Optionally, in this embodiment of this application, with reference to FIG. 2 and as shown in FIG. 3, in a case that the step 202 is "UE performs any one of the following processing in a case that IDC interference is present in the UE: transmitting additional information, transmitting first information and additional information, or transmitting first information, second information, and additional information", after the step 202, the information processing method provided in this embodiment of this application may further include the following steps 301 and 302.

Step 301. A first network device receives additional information transmitted by the UE.

In this embodiment of this application, the additional information is transmitted in a case that IDC interference is present in the UE, and the additional information is used to indicate that the UE is affected by IDC interference.

Step 302. The first network device transmits the additional information to a second network device.

Optionally, in this embodiment of this application, the first network device may be a base station (for example, a first base station), and the second network device may be a base station (for example, a second base station). During a handover of the UE, the first base station may transmit the additional information to the second base station.

Optionally, in this embodiment of this application, the first network device may be a master node (MN) or a secondary node ((SN), for example, a first SN, and the second network device may be an SN (for example, a second SN). In an SN addition or change procedure, the MN or the first SN may transmit the additional information to the second SN.

In this embodiment of this application, the first network device may transmit the received additional information (which is used to indicate that the UE is affected by IDC interference) to the second network device, so that the second network can also know that the UE is affected by IDC interference, and can perform, according to the additional information, a corresponding action accurately on information subsequently transmitted by the UE.

Optionally, in this embodiment of this application, before the step 302, the information processing method provided in this embodiment of this application may further include the following step 401 or step 402.

Step 401. The first network device receives first information transmitted by the UE.

Step 402. The first network device receives first information and second information that are transmitted by the UE.

It should be noted that in this embodiment of this application, an execution sequence of the step 301 and the step 401 (or the step 402) is not limited. In a possible implementation, the step 301 may be performed before the step 401 (or the step 402), that is, the first network device first receives additional information transmitted by the UE, and then receives first information transmitted by the UE (or first information and second information that are transmitted by the UE). In another possible implementation, the step 401 (or the step 402) may be performed before the step 301, that is, the first network device first receives first information transmitted by the UE (or first information and second information that are transmitted by the UE), and then receives additional information transmitted by the UE. In still another possible implementation, the step 301 and the step 401 (or the step 402) may be performed simultaneously, that is, the first network device simultaneously receives additional information and first information that are transmitted by the UE (or simultaneously receives additional information, first information, and second information that are transmitted by the UE).

In this embodiment of this application, the first network device may receive additional information and first information, or may receive additional information, first information, and second information, so that the first network device can distinguish between the information provided by the UE and affected by IDC interference and the information provided by the UE and not affected by IDC interference, and can perform a corresponding action accurately on the first information and the second information.

Optionally, in this embodiment of this application, the first information is the connection failure report provided by the UE and not affected by IDC interference, and the second information is the connection failure report provided by the UE and affected by IDC interference. With reference to FIG. 2 and as shown in FIG. 4, before the step 202 that "UE performs any one of the following processing", the information processing method provided in this embodiment of this application may further include the following step 501, and the step 202 that "UE performs any one of the following processing" may be specifically implemented through the following step 202a.

Step 501. The UE determines whether the UE connection failure is caused by IDC interference in a case that IDC interference is present in the UE and that the UE fails to be connected.

Figure 4:
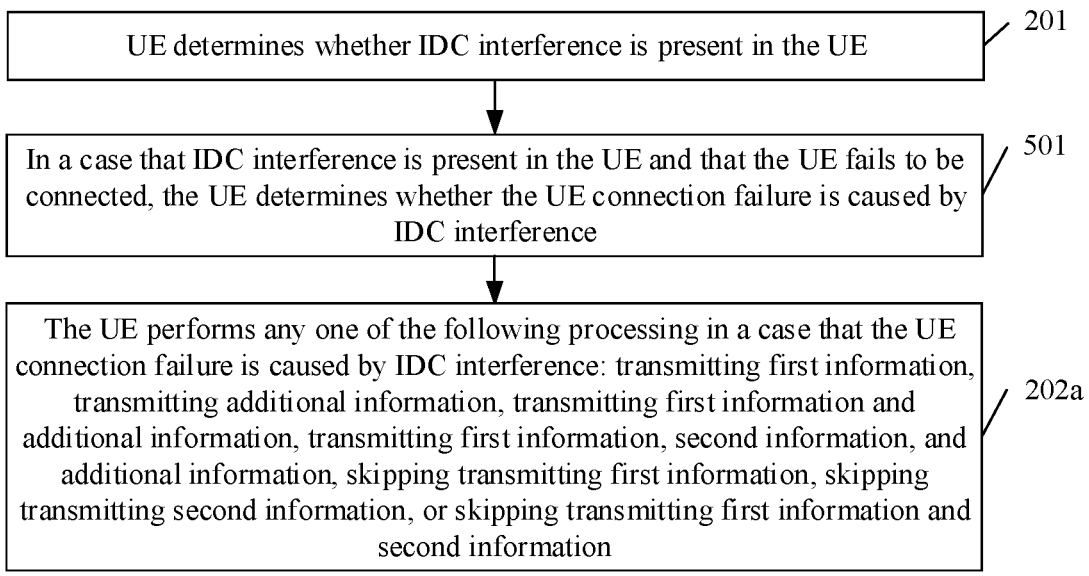
FIG. 4 is a third schematic diagram of an information processing method according to an embodiment of this application.
Figure 5:
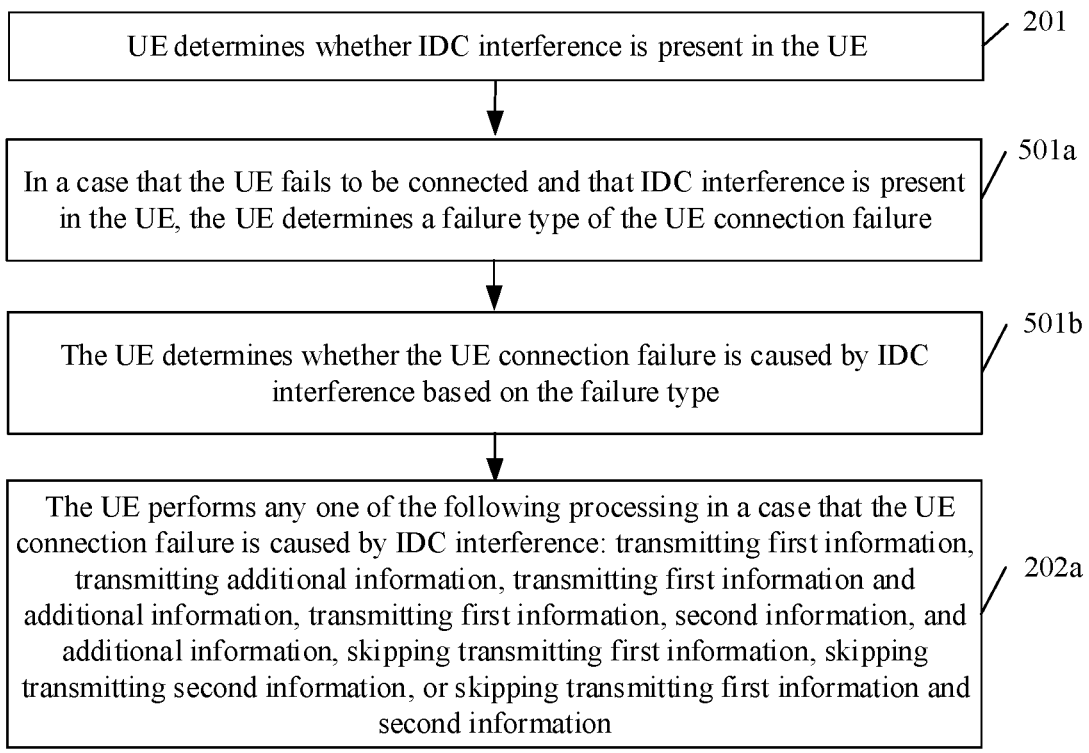
FIG. 5 is a fourth schematic diagram of an information processing method according to an embodiment of this application.

Optionally, in this embodiment of this application, with reference to FIG. 4 and as shown in FIG. 5, the step 501 may be specifically implemented through following steps 501a and 501b.

Step 501a. The UE determines a failure type of the UE connection failure in a case that the UE fails to be connected and that IDC interference is present in the UE.

It should be noted that for description of a failure type of a UE connection failure, reference may be made to the description in the foregoing embodiment, and details are not described herein again.

Step 501b. The UE determines whether the UE connection failure is caused by IDC interference based on the failure type.

Optionally, in this embodiment of this application, the step 501b may be specifically implemented through the following step 501b1 or step 501b2.

Step 501b1. The UE determines that the UE connection failure is caused by IDC interference in a case that the failure type is a target failure type.

In this embodiment of this application, the target failure type may include any one of the following: physical layer out of synchronization, random access failure, or beam failure.

It should be noted that in this embodiment of this application, the physical layer out of synchronization may be understood as: a receiving frequency used in radio link monitoring (RLM) is affected by IDC interference; the random access failure may be understood as: a downlink message in a random access procedure (for example, Msg2, Msg4, or MsgB in a two-step random access procedure) is affected by IDC interference, and the UE cannot receive the downlink message; and the beam failure may be understood as: a receiving signal (or receiving frequency) used in beam failure detection is affected by IDC interference.

Step 501b2. The UE determines that the UE connection failure is not caused by IDC interference in a case that the failure type is not a target failure type.

Step 202a. The UE performs any one of the following processing in a case that the UE connection failure is caused by IDC interference: transmitting first information, transmitting additional information, transmitting first information and additional information, transmitting first information, second information, and additional information, skipping transmitting first information, skipping transmitting second information, or skipping transmitting first information and second information.

It may be understood that the first information in the step 202a may be the connection failure report provided by the UE and not affected by IDC interference, and the second information may be the connection failure report provided by the UE and affected by IDC interference.

In this embodiment of this application, the UE may determine whether the UE connection failure is caused by IDC interference based on the failure type of the UE connection failure, and perform any one of the above processing on information in the UE (for example, first information, second information, and/or additional information), thereby further improving accuracy of the information reported by the UE.

Figure 6:
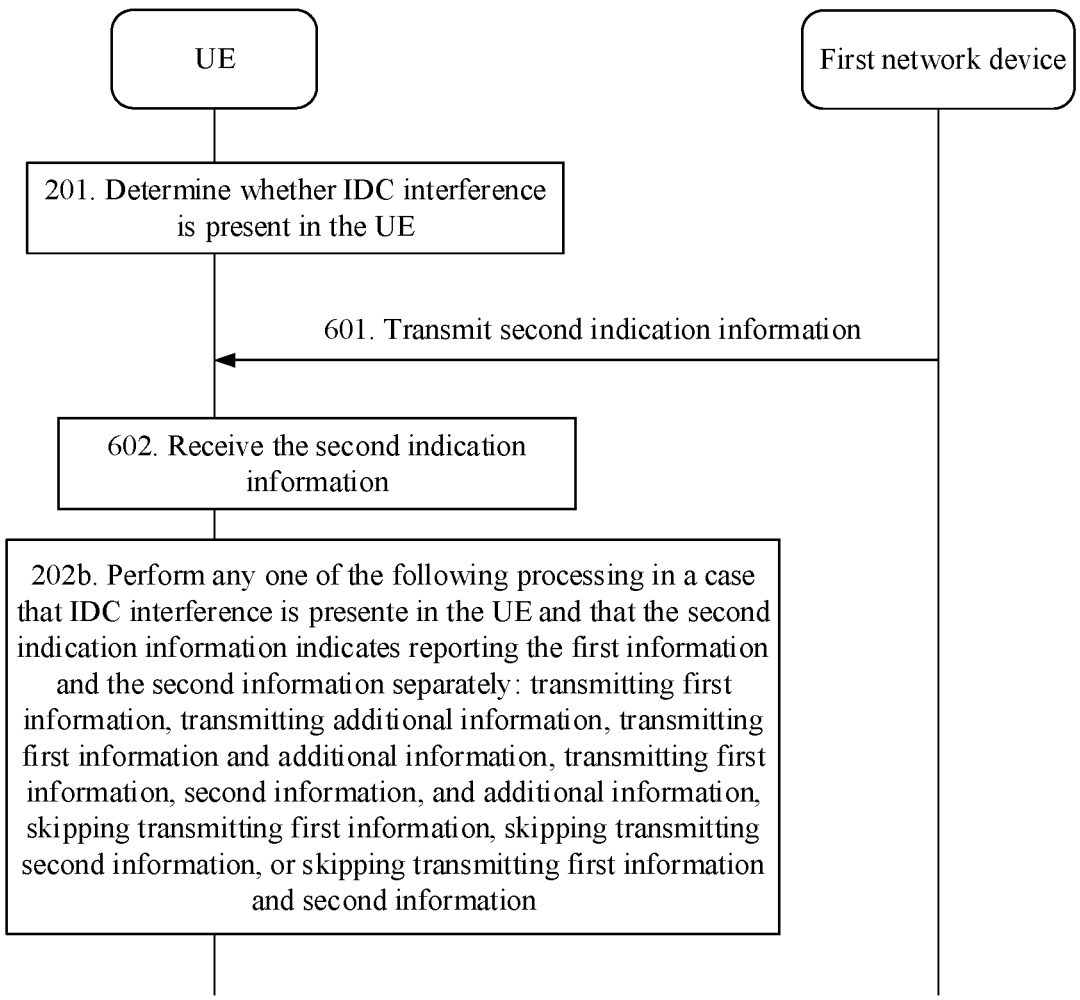
FIG. 6 is a fifth schematic diagram of an information processing method according to an embodiment of this application.

Optionally, in this embodiment of this application, with reference to FIG. 2 and as shown in FIG. 6, before the step 202, the information processing method provided in this embodiment of this application may further include the following steps 601 and 602, and the step 202 may be specifically implemented through the following step 202b.

Step 601. A first network device transmits second indication information to the UE.

In this embodiment of this application, the second indication information is used to indicate whether to report the information provided by the UE and not affected by IDC interference and the information provided by the UE and affected by IDC interference separately (that is, the second indication information is used to indicate whether to report the first information and the second information separately).

It should be noted that in this embodiment of this application, a network device corresponds to the first network device (that is, the network device is the first network device), and target indication information corresponds to second indication information (that is, the target indication information is the second indication information).

Step 602: The UE receives the second indication information transmitted by the first network device.

Step 202b. The UE performs any one of the following processing in a case that IDC interference is present in the UE and that the second indication information indicates reporting the first information and the second information separately: transmitting first information, transmitting additional information, transmitting first information and additional information, transmitting first information, second information, and additional information, skipping transmitting first information, skipping transmitting second information, or skipping transmitting first information and second information.

Optionally, in this embodiment of this application, in a case that IDC interference is present in the UE and that the second indication information indicates not reporting the first information and the second information separately, the UE may report the first information and the second information to the network device according to a prior-art method (for example, transmitting all measurement results (including the measurement result affected by IDC interference and the measurement result not affected by IDC interference) to the network device).

Optionally, in this embodiment of this application, in a case that IDC interference is present in the UE and that the second indication information indicates reporting the first information and the second information separately, the first network device may receive the first information transmitted by the UE.

Optionally, in this embodiment of this application, in a case that IDC interference is present in the UE and that the second indication information indicates reporting the first information and the second information separately, the first network device may receive the additional information transmitted by the UE.

Optionally, in this embodiment of this application, in a case that IDC interference is present in the UE and that the second indication information indicates reporting the first information and the second information separately, the first network device may receive the first information and the additional information that are transmitted by the UE.

Optionally, in this embodiment of this application, in a case that IDC interference is present in the UE and that the second indication information indicates reporting the first information and the second information separately, the first network device may receive the first information, the second information, and the additional information that are transmitted by the UE.

In this embodiment of this application, the UE may determine, based on the indication from the network device (for example, indicating reporting the first information and the second information separately), to perform any one of the above processing on the information in the UE (for example, the first information, the second information, and/or the additional information), so as to avoid that information which is not accurate enough is reported by the UE, thereby improving the accuracy of the information reported by the UE.

Figure 7:
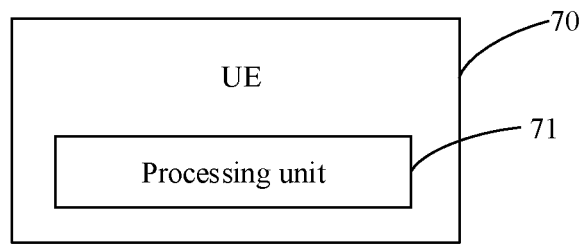
FIG. 7 is a first schematic structural diagram of UE according to an embodiment of this application.

FIG. 7 is a possible schematic structural diagram of UE according to an embodiment of this application. As shown in FIG. 7, the UE 70 provided in this embodiment of this application may include a processing unit 71.

The processing unit 71 is configured to perform any one of the following processing in a case that IDC interference is present in the UE: transmitting first information, transmitting additional information, transmitting first information and additional information, transmitting first information, second information, and additional information, skipping transmitting first information, skipping transmitting second information, or skipping transmitting first information and second information, where the first information is the information provided by the UE and not affected by IDC interference, the second information is the information provided by the UE and affected by IDC interference, and the additional information is used to indicate that the UE is affected by IDC interference.

In a possible implementation, the additional information may include at least one of the following: first indication information, first frequency information, first cell information, first cell group information, first beam information, or first type information, where the first indication information is used to indicate that the UE is affected by IDC interference, the first frequency information is used to indicate a frequency corresponding to the information provided by the UE and affected by IDC interference, the first cell information is used to indicate a cell corresponding to the information provided by the UE and affected by IDC interference, the first cell group information is used to indicate a cell group corresponding to the information provided by the UE and affected by IDC interference, the first beam information is used to indicate a beam corresponding to the information provided by the UE and affected by IDC interference, and the first type information is used to indicate a type corresponding to the information provided by the UE and affected by IDC interference.

In a possible implementation, in a case that the information provided by the UE and affected by IDC interference is a measurement result, the first type information is used to indicate a measurement type corresponding to the measurement result provided by the UE and affected by IDC interference. The first type information may include at least one of the following: RSRP, RSRQ, RSTD, RSSI, BLER, CR, CBR, or SINR.

In a possible implementation, the first beam information may include at least one of the following: SSB identifier or CSI-RS identifier.

Figure 8:
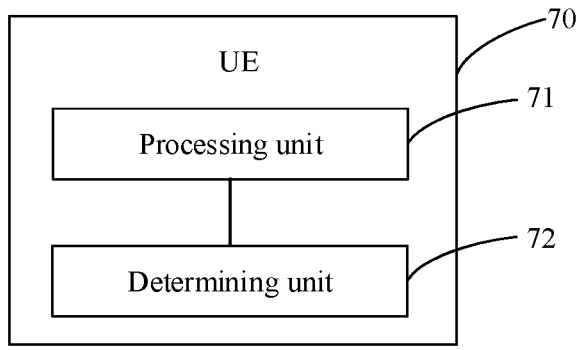
FIG. 8 is a second schematic structural diagram of UE according to an embodiment of this application.

In a possible implementation, the first information is the connection failure report provided by the UE and not affected by IDC interference, and the second information is the connection failure report provided by the UE and affected by IDC interference. With reference to FIG. 7 and as shown in FIG. 8, the UE 70 provided in this embodiment of this application may further include a determining unit 72, where the determining unit 72 is configured to determine, before the processing unit 71 performs the any one of the following processing, whether the UE connection failure is caused by IDC interference in a case that the UE fails to be connected. The processing unit 71 is specifically configured to perform the any one of the following processing in a case that the determining unit 72 determines that the UE connection failure is caused by IDC interference.

In a possible implementation, the determining unit 72 is specifically configured to determine a failure type of the UE connection failure, and determine whether the UE connection failure is caused by IDC interference based on the failure type.

In a possible implementation, the determining unit 72 is specifically configured to determine that the UE connection failure is caused by IDC interference in a case that the failure type is a target failure type; or determine that the UE connection failure is not caused by IDC interference in a case that the failure type is not a target failure type; where the target failure type includes any one of the following: physical layer out of synchronization, random access failure, or beam failure.

Figure 9:
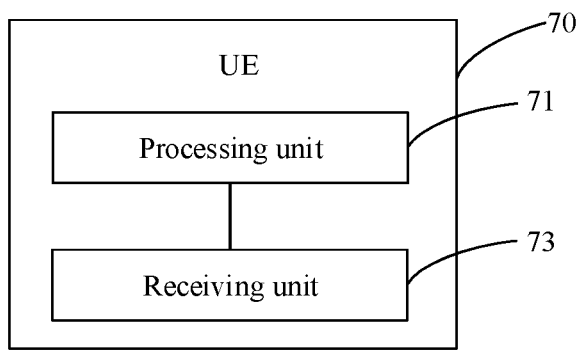
FIG. 9 is a third schematic structural diagram of UE according to an embodiment of this application.

In a possible implementation, with reference to FIG. 7 and as shown in FIG. 9, the UE 70 provided in this embodiment of this application may further include a receiving unit 73, where the receiving unit 73 is configured to receive second indication information transmitted by a network device, before the processing unit 71 performs the any one of the following processing in a case that IDC interference is present in the UE, where the second indication information is used to indicate whether to report the first information and the second information separately. The processing unit 71 is specifically configured to perform the any one of the following processing in a case that IDC interference is present in the UE and that the second indication information received by the receiving unit 73 indicates reporting the first information and the second information separately.

In a possible implementation, the first information is the measurement result provided by the UE and not affected by IDC interference, and the second information is the measurement result provided by the UE and affected by IDC interference. Alternatively, the first information is the connection failure report provided by the UE and not affected by IDC interference, and the second information is the connection failure report provided by the UE and affected by IDC interference.

The UE provided in this embodiment of this application can implement the processes implemented by the UE in the foregoing method embodiments. To avoid repetition, details are not described herein again.

This embodiment of this application provides UE. The UE does not directly transmit the first information and the second information to the network device in a case that IDC interference is present in the UE, avoiding that information which is not accurate enough is reported by the UE, thereby improving the accuracy of the information reported by the UE.

Figure 10:
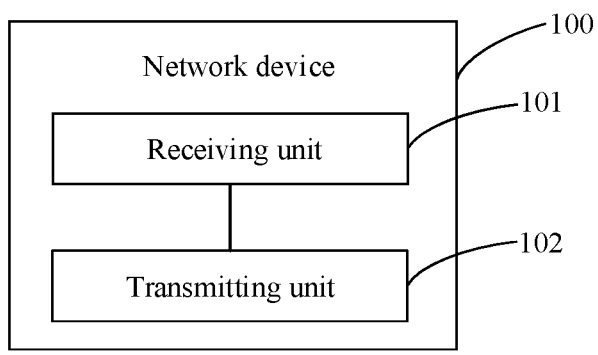
FIG. 10 is a schematic structural diagram of a network device according to an embodiment of this application.

FIG. 10 is a possible schematic structural diagram of a network device according to an embodiment of this application. The network device is a first network device. As shown in FIG. 10, the network device 100 provided in this embodiment of this application may include a receiving unit 101 and a transmitting unit 102.

The receiving unit 101 is configured to receive additional information transmitted by UE, where the additional information is transmitted in a case that IDC interference is present in the UE, and the additional information is used to indicate that the UE is affected by IDC interference. The transmitting unit 102 is configured to transmit the additional information received by the receiving unit 101 to a second network device.

In a possible implementation, the receiving unit 101 is further configured to receive first information transmitted by the UE, or receive first information and second information that are transmitted by the UE, where the first information is the information provided by the UE and not affected by IDC interference, and the second information is the information provided by the UE and affected by IDC interference.

In a possible implementation, the additional information may include at least one of the following: first indication information, first frequency information, first cell information, first cell group information, first beam information, or first type information, where the first indication information is used to indicate that the UE is affected by IDC interference, the first frequency information is used to indicate a frequency corresponding to the information provided by the UE and affected by IDC interference, the first cell information is used to indicate a cell corresponding to the information provided by the UE and affected by IDC interference, the first cell group information is used to indicate a cell group corresponding to the information provided by the UE and affected by IDC interference, the first beam information is used to indicate a beam corresponding to the information provided by the UE and affected by IDC interference, and the first type information is used to indicate a type corresponding to the information provided by the UE and affected by IDC interference.

In a possible implementation, in a case that the information provided by the UE and affected by IDC interference is a measurement result, the first type information is used to indicate a measurement type corresponding to the measurement result provided by the UE and affected by IDC interference. The first type information may include at least one of the following: RSRP, RSRQ, RSTD, RSSI, BLER, CR, CBR, or SINR.

In a possible implementation, the first beam information may include at least one of the following: SSB identifier or CSI-RS identifier.

In a possible implementation, the transmitting unit 102 is further configured to transmit target indication information to the UE before the receiving unit 101 receives the additional information transmitted by the UE, where the target indication information is used to indicate whether to report the information provided by the UE and not affected by IDC interference and the information provided by the UE and affected by IDC interference separately; and the receiving unit 101 is specifically configured to receive the additional information transmitted by the UE in a case that the target indication information transmitted by the transmitting unit 102 indicates reporting the information provided by the UE and not affected by IDC interference and the information provided by the UE and affected by IDC interference separately.

In a possible implementation, the first information is the measurement result provided by the UE and not affected by IDC interference, and the second information is the measurement result provided by the UE and affected by IDC interference. Alternatively, the first information is the connection failure report provided by the UE and not affected by IDC interference, and the second information is the connection failure report provided by the UE and affected by IDC interference.

The network device provided in this embodiment of this application can implement the processes implemented by the first network device in the foregoing method embodiments. To avoid repetition, details are not described herein again.

This embodiment of this application provides a network device, where the network device is the first network device and the first network device may transmit the received additional information (which is used to indicate that the UE is affected by IDC interference) to the second network device, so that the second network can also know that the UE is affected by IDC interference, and can perform, according to the additional information, a corresponding action accurately on information subsequently transmitted by the UE.

Figure 11:
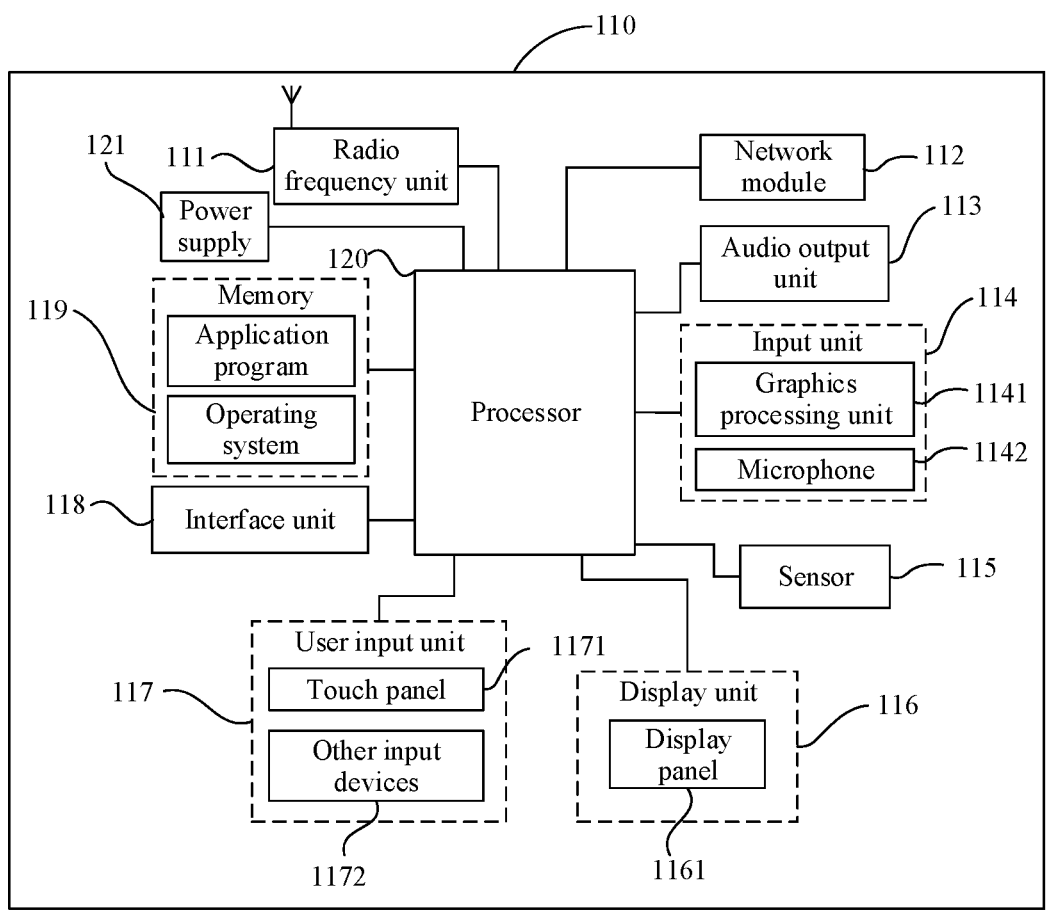
FIG. 11 is a schematic hardware diagram of UE according to an embodiment of this application.

FIG. 11 is a schematic hardware diagram of UE according to an embodiment of this application. As shown in FIG. 11, the UE 110 includes but is not limited to components such as a radio frequency unit 111, a network module 112, an audio output unit 113, an input unit 114, a sensor 115, a display unit 116, a user input unit 117, an interface unit 118, a memory 119, a processor 120, and a power supply 121.

It should be noted that a person skilled in the art can understand that the structure of the UE shown in FIG. 11 does not constitute a limitation on the UE. The UE may include more or fewer components than those shown in FIG. 11, or combine some of the components, or arrange the components differently. For example, in this embodiment of this application, the UE includes but is not limited to a mobile phone, a tablet computer, a notebook computer, a palmtop computer, an in-vehicle terminal, a wearable device, a pedometer, or the like.

The processor 120 is configured to perform any one of the following processing in a case that IDC interference is present in the UE: transmitting first information, transmitting additional information, transmitting first information and additional information, transmitting first information, second information, and additional information, skipping transmitting first information, skipping transmitting second information, or skipping transmitting first information and second information, where the first information is the information provided by the UE and not affected by IDC interference, the second information is the information provided by the UE and affected by IDC interference, and the additional information is used to indicate that the UE is affected by IDC interference.

This embodiment of this application provides UE. The UE does not directly transmit the first information and the second information to the network device in a case that IDC interference is present in the UE, avoiding that information which is not accurate enough is reported by the UE, thereby improving the accuracy of the information reported by the UE.

It should be understood that in this embodiment of this application, the radio frequency unit 111 may be configured to receive and transmit information, or to receive and transmit a signal in a call process, and specifically, after receiving downlink data from a base station, transmit the downlink data to the processor 120 for processing; and also transmit uplink data to the base station. Typically, the radio frequency unit 111 includes but is not limited to an antenna, at least one amplifier, a transceiver, a coupler, a low noise amplifier, a duplexer, and the like. In addition, the radio frequency unit 111 may also communicate with a network and other devices via a wireless communications system.

The UE provides wireless broadband Internet access for a user by using the network module 112, for example, helps the user transmit and receive e-mails, browse web pages, and access streaming media.

The audio output unit 113 may convert audio data received by the radio frequency unit 111 or the network module 112 or stored in the memory 119 into an audio signal and output the audio signal as a sound. In addition, the audio output unit 113 may further provide an audio output (for example, a call signal reception sound or a message reception sound) related to a specific function performed by the UE 110. The audio output unit 113 includes a speaker, a buzzer, a receiver, and the like.

The input unit 114 is configured to receive an audio signal or a video signal. The input unit 114 may include a graphics processing unit (GPU) 1141 and a microphone 1142. The graphics processing unit 1141 processes image data of a static picture or a video obtained by an image capture apparatus (for example, a camera) in an image capture mode or a video capture mode. A processed image frame may be displayed on the display unit 116. An image frame processed by the graphics processing unit 1141 may be stored in the memory 119 (or another storage medium) or transmitted by the radio frequency unit 111 or the network module 112. The microphone 1142 is capable of receiving sounds and processing such sounds into audio data. The processed audio data may be converted in a telephone call mode into a format that can be transmitted by the radio frequency unit 111 to a mobile communications base station, for outputting.

The UE 110 further includes at least one sensor 115, for example, an optical sensor, a motion sensor, and another sensor. Specifically, the optical sensor includes an ambient light sensor and a proximity sensor, where the ambient light sensor can adjust luminance of the display panel 1161 based on brightness of ambient light, and the proximity sensor can turn off the display panel 1161 and/or backlight when the UE 110 is moved to an ear. As a type of motion sensor, an accelerometer sensor can detect magnitudes of accelerations in all directions (usually three axes), can detect a magnitude and a direction of gravity when the UE is in a static state, and can be applied to UE posture recognition (such as screen switching between portrait and landscape, related games, and magnetometer posture calibration), functions related to vibration recognition (such as pedometer and tapping), and the like. The sensor 115 may also include a fingerprint sensor, a pressure sensor, an iris sensor, a molecular sensor, a gyroscope, a barometer, a hygrometer, a thermometer, an infrared sensor, and the like. Details are not described herein.

The display unit 116 is configured to display information input by the user or information provided for the user. The display unit 116 may include the display panel 1161. The display panel 1161 may be configured in a form of a liquid crystal display (LCD), an organic light-emitting diode (OLED), or the like.

The user input unit 117 may be configured to receive input digit or character information and generate key signal input related to user setting and function control of the UE. Specifically, the user input unit 117 includes a touch panel 1171 and other input devices 1172. The touch panel 1171, also referred to as a touchscreen, may capture a touch operation performed by a user on or near the touch panel (for example, an operation performed by the user on the touch panel 1171 or near the touch panel 1171 by using a finger or any appropriate object or accessory such as a stylus). The touch panel 1171 may include two parts: a touch detection apparatus and a touch controller. The touch detection apparatus detects a touch position of the user, detects a signal carried by a touch operation, and transmits the signal to the touch controller. The touch controller receives touch information from the touch detection apparatus, converts the touch information into point coordinates, transmits the point coordinates to the processor 120, and receives and executes a command transmitted by the processor 120. In addition, the touch panel 1171 may be implemented in multiple types, for example, as a resistive, capacitive, infrared, or surface acoustic wave touch panel. In addition to the touch panel 1171, the user input unit 117 may further include other input devices 1172. Specifically, the other input devices 1172 may include but are not limited to a physical keyboard, a function key (for example, a volume control key or a power on/off key), a trackball, a mouse, a joystick, and the like. Details are not described herein.

Further, the touch panel 1171 may cover the display panel 1161. After detecting a touch operation on or near the touch panel 1171, the touch panel 1171 transmits the touch operation to the processor 120 to determine a type of a touch event. Then the processor 120 provides corresponding visual output on the display panel 1161 based on the type of the touch event. Although in FIG. 11, the touch panel 1171 and the display panel 1161 act as two independent parts to implement input and output functions of the UE, in some embodiments, the touch panel 1171 and the display panel 1161 may be integrated to implement the input and output functions of the UE. This is not specifically limited herein.

The interface unit 118 is an interface connecting an external apparatus to the UE 110. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 118 may be configured to receive input (for example, data information and power) from the external apparatus, and transmit the received input to one or more elements of the UE 110, or may be configured to transmit data between the UE 110 and the external apparatus.

The memory 119 may be configured to store software programs and various data. The memory 119 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 119 may include a high-speed random access memory, and may further include a non-volatile memory such as a disk storage device, a flash memory device, or another volatile solid-state storage device.

The processor 120 is a control center of the UE, and is connected to all components of the UE by using various interfaces and lines. By running or executing a software program and/or module that is stored in the memory 119 and calling data stored in the memory 119, the processor 120 executes various functions of the UE and processes data, so as to perform overall monitoring on the UE. The processor 120 may include one or more processing units. Optionally, the processor 120 may integrate an application processor and a modem processor. The application processor mainly processes an operating system, a user interface, an application program, and the like. The modem processor mainly processes wireless communication. It may be understood that the modem processor may alternatively not be integrated in the processor 120.

The UE 110 may further include a power supply 121 (such as a battery) that supplies power to each component. Optionally, the power supply 121 may be logically connected to the processor 120 by using a power management system, to implement functions such as charging management, discharging management, and power consumption management by using the power management system.

In addition, the UE 110 includes some function modules that are not shown, details of which are not described herein.

Optionally, this embodiment of this application further provides UE, including a processor 120, a memory 119, and a computer program stored in the memory 119 and capable of running on the processor 120 that are shown in FIG. 11. When the computer program is executed by the processor 120, the processes of the foregoing method embodiments are implemented, with the same technical effects achieved. To avoid repetition, details are not described herein again.

An embodiment of this application further provides a computer-readable storage medium, where the computer-readable storage medium stores a computer program. When the computer program is executed by the processor 120 shown in FIG. 11, the processes of the foregoing method embodiments are implemented, with the same technical effects achieved. To avoid repetition, details are not described herein again. For example, the computer-readable storage medium is a read-only memory (ROM), a random access memory (RAM), a magnetic disk, an optical disc, or the like.

Figure 12:
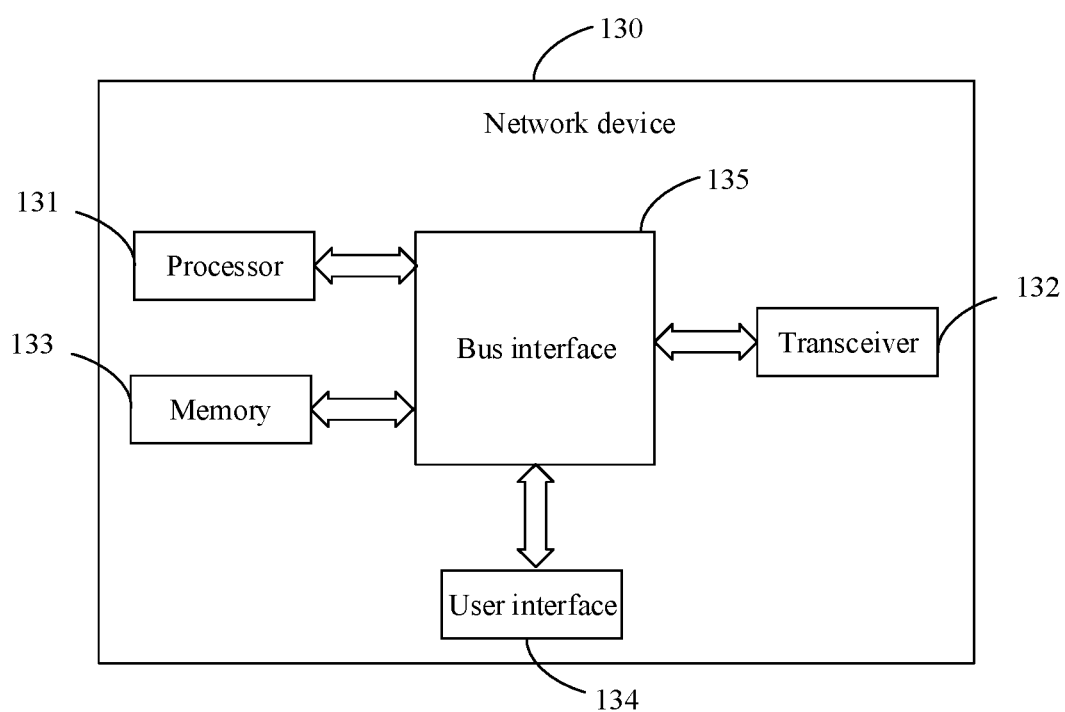
FIG. 12 is a schematic hardware diagram of a network device according to an embodiment of this application.

FIG. 12 is a schematic hardware diagram of a network device according to an embodiment of this application. As shown in FIG. 12, the network device 130 includes a processor 131, a transceiver 132, a memory 133, a user interface 134, and a bus interface 135.

The transceiver 132 is configured to receive additional information transmitted by UE, and transmit the additional information to a second network device, where the additional information is transmitted in a case that IDC interference is present in the UE, and the additional information is used to indicate that the UE is affected by IDC interference.

This embodiment of this application provides a network device, where the first network device may transmit the received additional information (which is used to indicate that the UE is affected by IDC interference) to the second network device, so that the second network can also know that the UE is affected by IDC interference, and can perform, according to the additional information, a corresponding action accurately on information subsequently transmitted by the UE.

The processor 131 may be responsible for bus architecture management and general processing. The processor 131 may be configured to read and execute the program in the memory 133 to implement a processing function and control the network device 130. The memory 133 may store data that the processor 131 uses when performing an operation. The processor 131 and the memory 133 may be integrated together or independently disposed.

In an embodiment of this application, the network device 130 may further include a computer program stored on the memory 133 and capable of running on the processor 131, where when the computer program is executed by the processor 131, the steps of the methods provided in the embodiments of this application are implemented.

In FIG. 12, a bus architecture may include any quantity of interconnected buses and bridges, and specifically connect together various circuits of one or more processors represented by the processor 131 and a memory represented by the memory 133. The bus architecture may further interconnect various other circuits such as a peripheral device, a voltage regulator, and a power management circuit. These are all well known in the art, and therefore are not further described in this embodiment of this application. The bus interface 135 provides interfaces. The transceiver 132 may be a plurality of components, including a transmitter and a receiver, and provides units for communicating with a variety of other apparatuses on a transmission medium. For different UEs, the user interface 134 may also be an interface that can be externally or internally connected to a required device. The connected device includes but is not limited to a keypad, a display, a speaker, a microphone, and a joystick.

An embodiment of this application further provides a computer-readable storage medium, where the computer-readable storage medium stores a computer program. When the computer program is executed by the processor 131 shown in FIG. 12, the processes of the foregoing method embodiments are implemented, with the same technical effects achieved. To avoid repetition, details are not described herein again. The computer-readable storage medium is, for example, a ROM, a RAM, a magnetic disc, or an optical disk.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, however, the former is a more preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in each embodiment of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An information processing method, applied to user equipment UE, wherein the method comprises:

receiving second indication information transmitted by a network device, wherein the second indication information is used to indicate whether to report first information and second information separately; and performing any one of the following processing in a case that in-device coexistence IDC interference is present in the UE and that the second indication information indicates reporting the first information and the second information separately;

transmitting the first information, transmitting the first information and additional information, transmitting the first information, the second information, and additional information, skipping transmitting the first information, skipping transmitting the second information, or skipping transmitting the first information and the second information, wherein the first information is the information provided by the UE and not affected by IDC interference, the second information is the information provided by the UE and affected by IDC interference, and the additional information is used to indicate that the UE is affected by IDC interference.

2. The method according to claim 1, wherein the additional information comprises at least one of the following: first indication information, first frequency information, first cell information, first cell group information, first beam information, or first type information, wherein the first indication information is used to indicate that the UE is affected by IDC interference, the first frequency information is used to indicate a frequency corresponding to the information provided by the UE and affected by IDC interference, the first cell information is used to indicate a cell corresponding to the information provided by the UE and affected by IDC interference, the first cell group information is used to indicate a cell group corresponding to the information provided by the UE and affected by IDC interference, the first beam information is used to indicate a beam corresponding to the information provided by the UE and affected by IDC interference, and the first type information is used to indicate a type corresponding to the information provided by the UE and affected by IDC interference.

3. The method according to claim 2, wherein in a case that the information provided by the UE and affected by IDC interference is a measurement result, the first type information is used to indicate a measurement type corresponding to the measurement result provided by the UE and affected by IDC interference; and the first type information comprises at least one of the following: reference signal received power RSRP, reference signal received quality RSRQ, reference signal time difference RSTD, received signal strength indicator RSSI, block error rate BLER, channel occupation ratio CR, channel busy ratio CBR, or signal to interference plus noise ratio SINR.

4. The method according to claim 2, wherein the first beam information comprises at least one of the following: synchronization signal block SSB identifier or channel state information reference signal CSI-RS identifier.

5. The method according to claim 1, wherein the first information is the connection failure report provided by the UE and not affected by IDC interference, and the second information is the connection failure report provided by the UE and affected by IDC interference;

before the performing any one of the following processing, the method further comprises:

determining whether the UE connection failure is caused by IDC interference in a case that the UE fails to be connected; and the performing any one of the following processing comprises:

performing the any one of the following processing in a case that the UE connection failure is caused by IDC interference.

6. The method according to claim 5, wherein the determining whether the UE connection failure is caused by IDC interference comprises:

determining a failure type of the UE connection failure; and determining whether the UE connection failure is caused by IDC interference based on the failure type.

7. The method according to claim 6, wherein the determining whether the UE connection failure is caused by IDC interference based on the failure type comprises:

determining that the UE connection failure is caused by IDC interference in a case that the failure type is a target failure type; or determining that the UE connection failure is not caused by IDC interference in a case that the failure type is not a target failure type; wherein the target failure type comprises any one of the following: physical layer out of synchronization, random access failure, or beam failure.

8. The method according to claim 1, wherein the first information is the measurement result provided by the UE and not affected by IDC interference, and the second information is the measurement result provided by the UE and affected by IDC interference;

or the first information is the connection failure report provided by the UE and not affected by IDC interference, and the second information is the connection failure report provided by the UE and affected by IDC interference.

9. A non-transitory computer-readable storage medium, wherein the non-transitory computer-readable storage medium stores a computer program, and when the computer program is executed by a processor, the steps of the information processing method according to claim 1 are implemented.

10. An information processing method, applied to a first network device, wherein the method comprises:

transmitting target indication information to user equipment UE, wherein the target indication information is used to indicate whether to report information pro ride the UE and not affected by IDC interference and information provided by the UE and affected by IDC interference separately; and receiving additional information transmitted by the UE in a case that the target indication information indicates reporting the information provided by the UE and not affected by IDC interference and the information provided by the UE and affected by IDC interference separately, wherein the additional information is transmitted in a case that in-device coexistence IDC interference is present in the UE, and the additional information is used to indicate that the UE is affected by IDC interference; and transmitting the additional information to a second network device;

wherein the method further comprises:

receiving first information transmitted by the UE;

or receiving first information and second information that are transmitted by the UE, wherein the first information is the information provided by the UE and not affected by IDC interference, and the second information is the information provided by the UE and affected by IDC interference.

11. The method according to claim 10, wherein the additional information comprises at least one of the following: first indication information, first frequency information, first cell information, first cell group information, first beam information, or first type information, wherein the first indication information is used to indicate that the UE is affected by IDC interference, the first frequency information is used to indicate a frequency corresponding to the information provided by the UE and affected by IDC interference, the first cell information is used to indicate a cell corresponding to the information provided by the UE and affected by IDC interference, the first cell group information is used to indicate a cell group corresponding to the information provided by the UE and affected by IDC interference, the first beam information is used to indicate a beam corresponding to the information provided by the UE and affected by IDC interference, and the first type information is used to indicate a type corresponding to the information provided by the UE and affected by IDC interference.

12. The method according to claim 11, wherein in a case that the information provided by the UE and affected by IDC interference is a measurement result, the first type information is used to indicate a measurement type corresponding to the measurement result provided by the UE and affected by IDC interference; and the first type information comprises at least one of the following: reference signal received power RSRP, reference signal received quality RSRQ, reference signal time difference RSTD, received signal strength indicator RSSI, block error rate BLER, channel occupation ratio CR, channel busy ratio CBR, or signal to interference plus noise ratio SINR.

13. The method according to claim 11, wherein the first beam information comprises at least one of the following: synchronization signal block SSB identifier or channel state information reference signal CSI-RS identifier.

14. The method according to claim 10, wherein the first information is the measurement result provided by the UE and not affected by IDC interference, and the second information is the measurement result provided by the UE and affected by IDC interference;

or the first information is the connection failure report provided by the UE and not affected by IDC interference, and the second information is the connection failure report provided by the UE and affected by IDC interference.

15. A network device, comprising a memory, a processor, and a computer program stored in the memory and capable of running on the processor, wherein when the computer program is executed by the processor, the steps of the information processing method according to claim 10 are implemented.

16. User equipment UE, comprising a memory, a processor, and a computer program stored in the memory and capable of running on the processor, wherein when the computer program is executed by the processor, the following steps are implemented:

receiving second indication information transmitted by a network device, wherein the second indication information is used to indicate whether to report first information and second information separately; and performing any one of the following processing in a case that in-device coexistence IDC interference is present in the UE and that the second indication information indicates re porting the first information and the second information separately;

transmitting the first information, transmitting the first information and additional information, transmitting the first information, the second information, and additional information, skipping transmitting the first information, skipping transmitting the second information, or skipping transmitting the first information and the second information, wherein the first information is the information provided by the UE and not affected by IDC interference, the second information is the information provided by the UE and affected by IDC interference, and the additional information is used to indicate that the UE is affected by IDC interference.

17. The UE according to claim 16, wherein the first information is the measurement result provided by the UE and not affected by IDC interference, and the second information is the measurement result provided by the UE and affected by IDC interference;

or the first information is the connection failure report provided by the UE and not affected by IDC interference, and the second information is the connection failure report provided by the UE and affected by IDC interference.

18. The UE according to claim 16, wherein the additional information comprises at least one of the following: first indication information, first frequency information, first cell information, first cell group information, first beam information, or first type information, wherein the first indication information is used to indicate that the UE is affected by IDC interference, the first frequency information is used to indicate a frequency corresponding to the information provided by the UE and affected by IDC interference, the first cell information is used to indicate a cell corresponding to the information provided by the UE and affected by IDC interference, the first cell group information is used to indicate a cell group corresponding to the information provided by the UE and affected by IDC interference, the first beam information is used to indicate a beam corresponding to the information provided by the UE and affected by IDC interference, and the first type information is used to indicate a type corresponding to the information provided by the UE and affected by IDC interference.

19. The UE according to claim 18, wherein in a case that the information provided by the UE and affected by IDC interference is a measurement result, the first type information is used to indicate a measurement type corresponding to the measurement result provided by the UE and affected by IDC interference; and the first type information comprises at least one of the following: reference signal received power RSRP, reference signal received quality RSRQ, reference signal time difference RSTD, received signal strength indicator RSSI, block error rate BLER, channel occupation ratio CR, channel busy ratio CBR, or signal to interference plus noise ratio SINR.

20. The UE according to claim 18, wherein the first beam information comprises at least one of the following: synchronization signal block SSB identifier or channel state information reference signal CSI-RS identifier.

* * * * *